United States Patent
Park

(10) Patent No.: US 8,279,494 B2
(45) Date of Patent: Oct. 2, 2012

(54) METHOD OF SETTING BACKGROUND PICTURE IN IMAGE PRINTER HAVING DISPLAY UNIT

(75) Inventor: Sang-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 11/282,760

(22) Filed: Nov. 21, 2005

(65) Prior Publication Data

US 2006/0109488 A1 May 25, 2006

(30) Foreign Application Priority Data

Nov. 20, 2004 (KR) .................. 10-2004-0095546

(51) Int. Cl.
- *H04N 1/38* (2006.01)
- *G06K 9/20* (2006.01)
- *G09G 5/00* (2006.01)

(52) U.S. Cl. ........... 358/464; 358/1.1; 358/1.2; 358/1.9; 358/2.1; 358/1.15; 358/1.14; 358/1.16; 358/1.18; 358/1.6; 358/2.99; 358/3.01; 358/3.21; 358/3.24; 358/501; 358/537; 358/448; 358/450; 358/452; 382/130; 382/164; 382/171; 382/173; 382/178; 382/206; 382/216; 382/220; 382/282; 382/284; 382/285; 382/289; 382/290; 382/293; 345/156; 345/158; 345/173; 345/204; 345/592; 345/593; 345/619; 345/625; 345/629; 345/671; 715/702; 715/716; 715/727; 715/730; 715/745; 715/760; 715/764; 715/765; 715/766; 715/781; 715/810; 715/835; 715/839; 715/849

(58) Field of Classification Search ............... 358/1.1, 358/1.2, 1.9, 2.1, 1.15, 1.14, 1.16, 1.18, 1.6, 358/2.99, 3.21, 3.24, 501, 537, 448, 450, 358/452, 3.01; 361/683, 684, 680; 382/130, 382/164, 171, 178, 206, 216, 282, 293, 179, 382/284–285, 289–290; 345/625, 9, 156
See application file for complete search history.

(56) References Cited

U.S. PATENT DOCUMENTS

| | | | |
|---|---|---|---|
| 5,706,410 A * | 1/1998 | Bagley et al. | 358/1.13 |
| 5,761,686 A * | 6/1998 | Bloomberg | 715/234 |
| 6,226,105 B1 * | 5/2001 | Fukushi | 358/452 |
| 6,789,482 B2 * | 9/2004 | Yokoyama et al. | 101/483 |
| 2002/0048413 A1 * | 4/2002 | Kusunoki | 382/282 |
| 2002/0191216 A1 * | 12/2002 | Umeda et al. | 358/1.15 |
| 2003/0202210 A1 * | 10/2003 | Anderson | 358/1.18 |
| 2004/0105126 A1 * | 6/2004 | Minowa et al. | 358/1.18 |

FOREIGN PATENT DOCUMENTS

JP  06-344603  12/1994

(Continued)

*Primary Examiner* — Steven Kau

(74) *Attorney, Agent, or Firm* — Roylance, Abrams, Berdo & Goodman, LLP

(57) ABSTRACT

There is provided an image printer having a display unit, in which a predetermined image can be set as a background picture of the display unit. The image printer includes an image processing unit processing an image selected by a user in accordance with a predetermined image processing technique so as to set the selected image as a background picture of the display unit; and a setting unit setting the processed image as the background picture of the display unit, wherein the display unit displays the processed image.

19 Claims, 9 Drawing Sheets

FOREIGN PATENT DOCUMENTS

| | | | |
|---|---|---|---|
| JP | 2000-216973 | * | 8/2000 |
| JP | 2002-216973 | * | 8/2000 |
| JP | 2000216973 A | * | 8/2000 |
| JP | 2001-010147 | | 1/2001 |
| JP | 2002-248833 | | 9/2002 |
| JP | 2002248833 A | * | 9/2002 |
| JP | 2003-044254 | | 2/2003 |
| JP | 2003-066784 | | 3/2003 |
| JP | 2003-274098 | | 9/2003 |
| JP | 2003-333323 | | 11/2003 |
| KR | 1997-0076222 | | 12/1997 |
| KR | 10-2003-0044251 | | 6/2003 |

* cited by examiner (a)    (b)

METHOD OF SETTING BACKGROUND PICTURE IN IMAGE PRINTER HAVING DISPLAY UNIT

CROSS-REFERENCE TO RELATED PATENT APPLICATION

This application claims the benefit under 35 U.S.C. §119(a) of Korean Patent Application No. 10-2004-0095546, filed on Nov. 20, 2004, in the Korean Intellectual Property Office, the entire disclosure of which is hereby incorporated by reference.

BACKGROUND OF THE INVENTION

1. Field of the Invention

The present invention relates to an image printer. More particularly, the present invention relates to an image printer having a display unit, in which a predetermined image can be set as a background picture of the display unit.

2. Description of the Related Art

Recently, image printers having a display unit such as a liquid crystal display (LCD) have been widely adopted. Users can see operation statuses of the image printer by displaying the operation statuses of the image printer on the display unit. Letters or figures indicating the operation statuses of the image printer are displayed on the display unit in which a predetermined image is used as a background picture.

However, since the image used as the background picture of the display unit was set in advance when manufacturing the image printers, only the image set in advance could be used as the background picture regardless of personal tastes of the users. However, personal tastes have been considered more and more important. Accordingly, there has been a need for an image printer in which a user can set a desired image as the background picture of the display unit in consideration the user's individual taste.

SUMMARY OF THE INVENTION

The present invention provides an image printer in which a user can set their desired image as a background picture of a display unit.

The present invention also provides a method of allowing a user to set their desired image as a background picture in an image printer having a display unit.

According to an aspect of the present invention, there is provided an image printer having a display unit, the image printer comprising an image processing unit for processing an image selected by a user in accordance with a predetermined image processing technique. A setting unit sets the processed image as the background picture of the display unit, wherein the display unit displays the processed image.

The image processing unit preferably comprises a first data converter for analyzing a file format of the image and converting the image into an image having a predetermined file format depending upon the type of the analyzed file format. A first image processor adjusts the converted image to a predetermined size and controls the state of the image in accordance with a predetermined image processing technique. A second data converter converts the processed image into a file format of the display unit.

The first image processor preferably comprises a scaling unit for scaling up or down the image to a predetermined size. A controller controls the state of the image by using the image processing technique.

The image printer preferably further comprises a second image processor for processing letters or figures displayed on the display unit along with the image into a complementary color of the processed image, wherein the second data converter converts the letters or figures into the file format of the display unit.

The second image processor preferably comprises a division unit for dividing the processed image to acquire an image area where the letters or figures are positioned. An analysis unit analyzes a color distribution of the acquired image area. A determination unit extracts dominant colors from the analyzed color distribution and determines an average color of the acquired image area. A change unit changes the color of the letters or figures to a complementary color of the determined average color.

According to another aspect of the present invention, there is provided a method of setting an image as a background picture of a display unit in an image printer. The method comprises processing an image selected by a user using a predetermined image processing technique (operation (a)). The processed image is set as the background picture of the display unit (operation (b)). The display unit displays the processed image.

Operation (a) preferably comprises analyzing a file format of the image and converting the image into an image having a predetermined file format depending upon the type of the analyzed file format (operation (a1)). The converted image is adjusted to a predetermined size and the state of the image is controlled using a predetermined image processing technique (operation (a2)). The processed image is converted into a file format of the display unit (operation (a3)).

Operation (a) may further comprise processing letters or figures displayed on the display unit along with the image into a complementary color of the processed image (operation (a4)), wherein the processed image and the letters or figures processed into the complementary color are converted into the file format of the display unit.

Operation (a4) preferably comprises dividing the processed image to acquire an image area where the letters or figures are positioned. A color distribution of the acquired image area is analyzed and dominant colors are extracted from the analyzed color distribution. An average color of the acquired image area is determined. The color of the letters or figures are changed to a complementary color of the determined average color.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numbers should be understood to refer to like elements, features and structures.

DETAILED DESCRIPTION OF EXEMPLARY EMBODIMENTS

Hereinafter, an image printer according to an embodiment of the present invention and a method of setting an image as a background picture of a display unit of the image printer will be described in detail with reference to the accompanying drawings.

Figure 1:
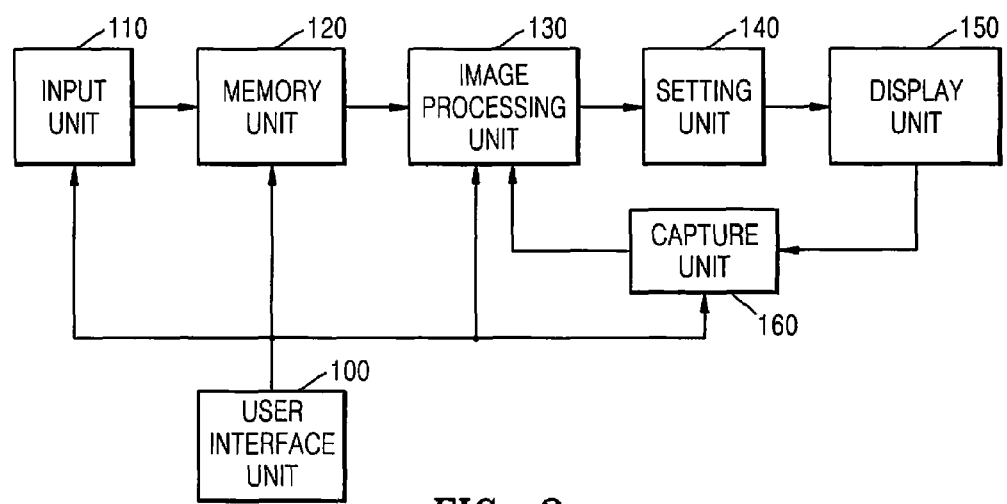
FIG. 1 shows a functional block diagram of an image printer according to an embodiment of the present invention.

FIG. 1 shows a functional block diagram of an image printer according to an embodiment of the present invention. Referring to FIG. 1, the image printer includes a user interface unit 100, an input unit 110, a memory unit 120, an image processing unit 130, a setting unit 140, a display unit 150, and a capture unit 160.

The input unit 110 receives an image from an external terminal (not shown). The external terminal may be any image storage units which can interface with the image printer. Preferably, examples of the external terminal can include a host computer connected to the image printer and a portable terminal such as a storage device connectable to the input unit, a digital camera, a mobile phone, and a digital camcorder connectable to the input unit, and a multimedia player having a storage device. However, it should be understand that these are merely examples, and the present invention is not limited to these examples. The image may be input from any suitable source depending upon the technical fields to which the present invention is applied. The images input from the external terminal through the input unit 110 can have any suitable image file format, including JPEG, BMP, or TIF file format.

The memory unit 120 stores the images input through the input unit 110 or stores an image determined by the maker at the time of manufacturing the image printer.

In order to set a predetermined image stored in the memory unit 120 as a background picture of the display unit 150, the image processing unit 130 processes the image by using a predetermined image processing technique. The image processing unit 130 converts letters or figures, which are displayed in the display unit 150 along with the processed image, into a complementary color of the image. The setting unit 140 sets the processed image as the background picture of the display unit 150.

The display unit 150 displays the image set as the background picture and the letters or figures. Preferably, the image printer according to an embodiment of the present invention further includes a capture unit 160, which captures a predetermined image area of the displayed image. The captured image area is processed by the image processing unit 130 as described above and can be set as the background picture of the display unit 150.

On the other hand, a user inputs a user command for inputting an image file from the external terminal, a user command for selecting an image from the memory unit 120, a user command for selecting an image processing technique used for the image processing unit 130 to process the image, and a user command for selecting an image area captured by the capture unit 160, through the user interface unit 100.

Figure 2:
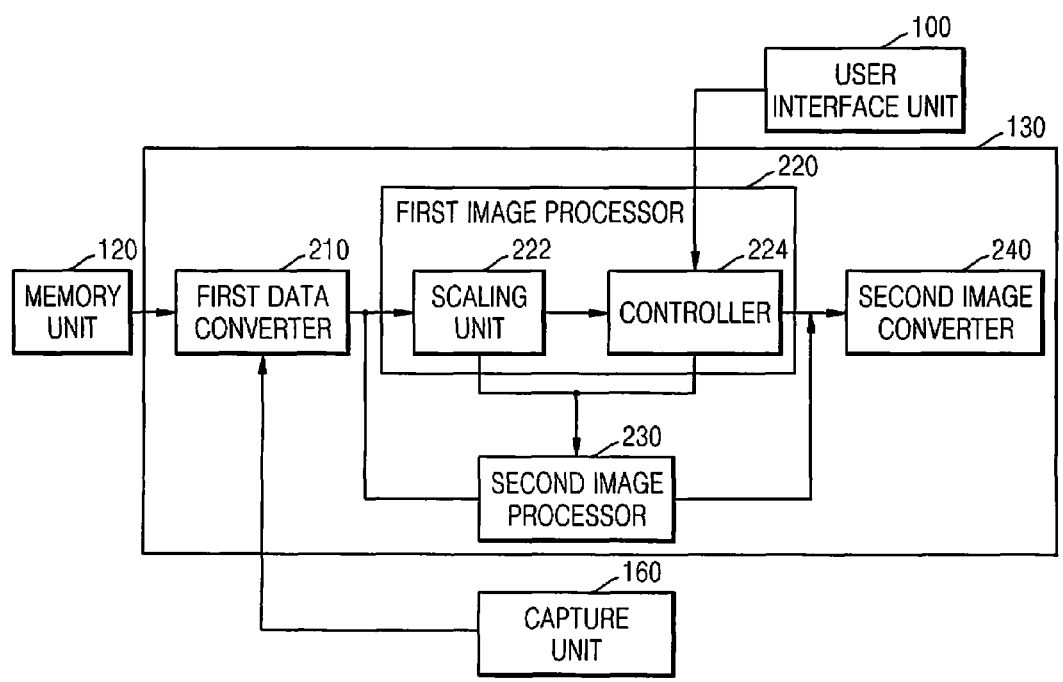
FIG. 2 shows a functional block diagram of an image processing unit according to an embodiment of the present invention.

FIG. 2 shows a functional block diagram of the image processing unit 130 according to an embodiment of the present invention. Referring to FIG. 2, the image processing unit 130 includes a first data converter 210, a first image processor 220, a second image processor 230, and a second data converter 240.

The first data converter 210 converts image data having a file format such as JPEG, BMP, and TIF input from the external terminal into image data having a predetermined file format. For example, image data having a JPEG file format are decompressed by a lossy JPEG decoder and are converted into image data having an YCC file format. Image data having a BMP or TIF file format are converted into image data having the YCC file format.

The first image processor 220 includes a scaling unit 222 and a controller 224. The scaling unit 222 scales up or down the converted image in accordance with the size of the display unit 150. Preferably, the converted image can be scaled up or down to a predetermined size. Preferably, the converted image may be scaled up or down to a predetermined size in accordance with the size of the display unit 150, depending upon the user's taste. The controller 224 controls the state of the image displayed on the display unit 150 by using predetermined image processing techniques such as sharpening, brightness adjustment, color contrast adjustment, and rotation. Preferably, the state of the image can be controlled using predetermined image processing techniques. More preferably, the state of the image can be controlled using the image processing techniques such as sharpening, brightness adjustment, color contrast, and rotation depending upon the user's taste.

On the other hand, the second image processor 230 processes the colors of the letters or figures displayed on the display unit 150 along with the image into a complementary color of the image. Preferably, the colors of the letters or figures can be set depending upon the user's taste, but the colors of the letters or figures may also be set automatically based on the background picture.

Figure 3:
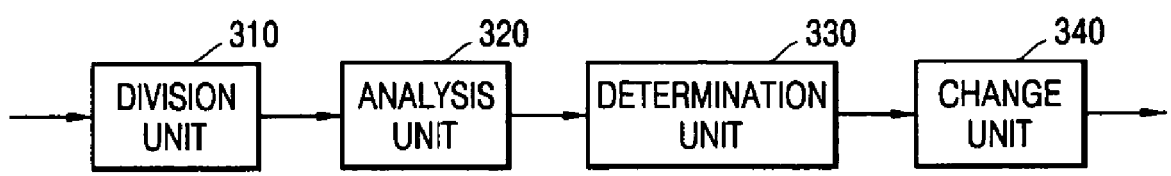
FIG. 3 shows a functional block diagram of a second image processing unit according to an embodiment of the present invention.

The second data converter 240 converts the image data processed by the first image processor 220 and the letters or figures processed by the second image processor 230 into data having a file format suitable for the display unit 150. The file format of the display unit is preferably an RGB file format, although any suitable format can be used. FIG. 3 shows a functional block diagram of a second image processor 230 according to an embodiment of the present invention. Referring to FIG. 3, the second image processor 230 includes a division unit 310, an analysis unit 320, a determination unit 330, and a change unit 340.

Figure 4:
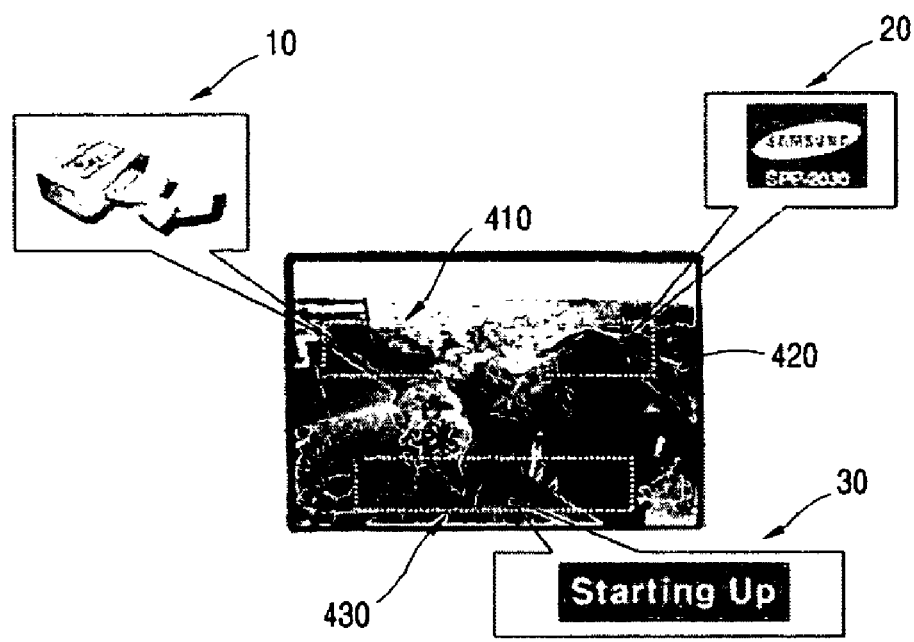
FIG. 4 shows a predetermined image area where letters or figures displayed along with an image of a background picture are positioned.

The division unit 310 divides the processed image to acquire a predetermined image area where the letters or figures displayed on the display unit 150 along with the image are positioned. FIG. 4 shows the image area where the letters or figures displayed along with the image of the background picture are positioned. The analysis unit 320 analyzes the color distribution of the image area. The determination unit 330 extracts dominant colors from the color distribution of the image area on the basis of the analyzed color distribution of the image area, and determines a complementary color of an average color of the extracted colors. The change unit 340 changes the colors of the letters or figures into the complementary color determined by the determination unit 330.

Figure 5:
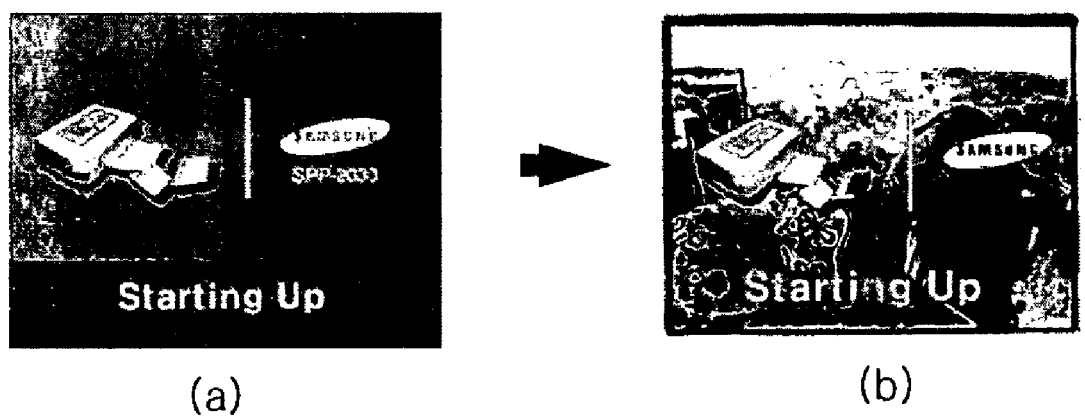
FIG. 5 shows an example of a background picture of a display unit set by an image printer according to an embodiment of the present invention.

FIG. 5 shows an example of the background picture of the display unit set by the image printer according to an embodiment of the present invention. In FIG. 5A, the operation status of the image printer is displayed on an original background picture before the image selected by the user is set as the background picture. In FIG. 5B, the image selected by the user is set as the background picture and the operation status of the image printer is displayed on the background picture.

Figure 6:
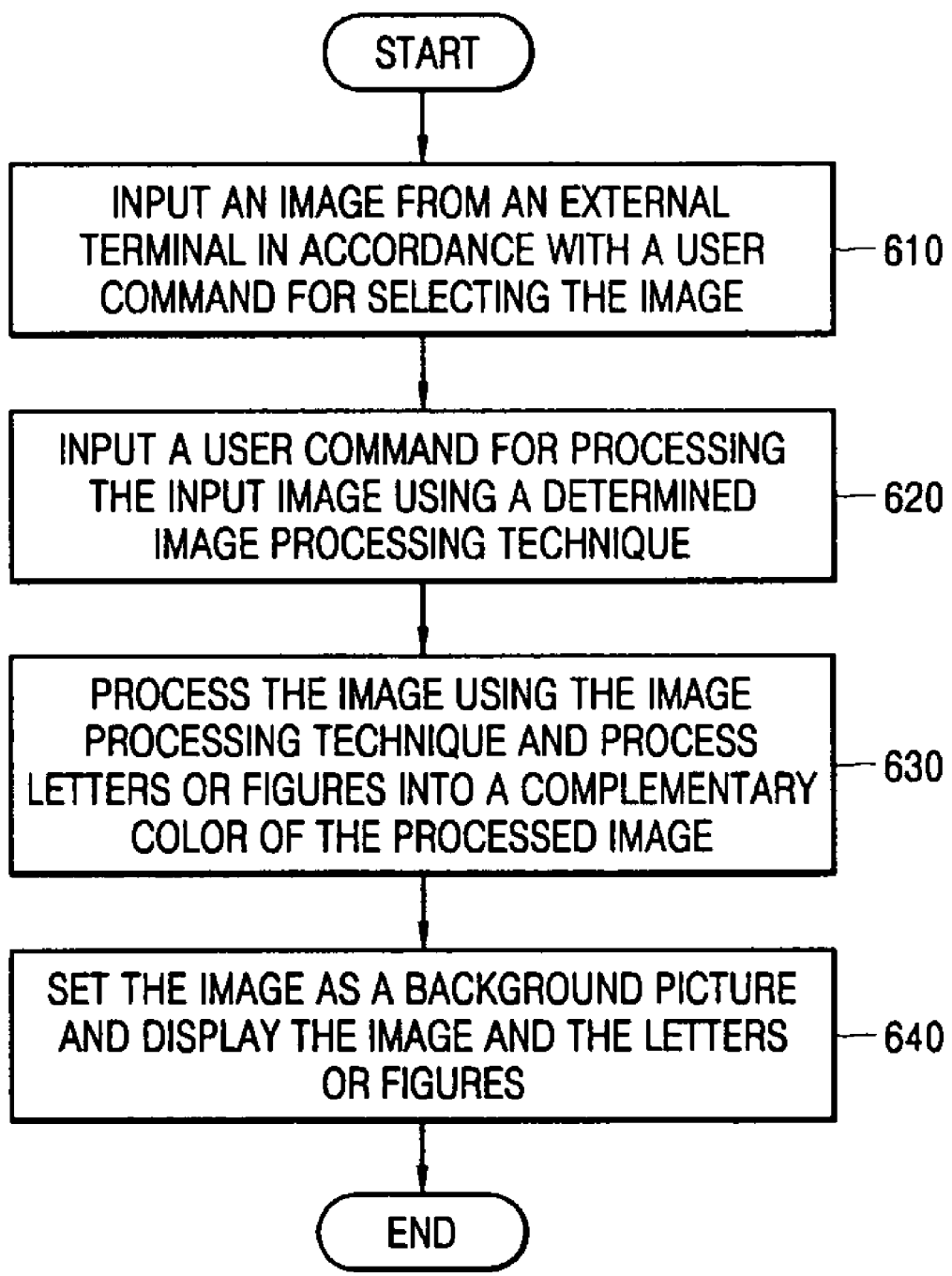
FIG. 6 is a flowchart illustrating a method of setting a background picture of a display unit of an image printer according to an embodiment of the present invention.

FIG. 6 is a flowchart illustrating a method of setting a background picture of the display unit of the image printer according to an embodiment of the present invention. Referring to FIG. 6, when a user command for selecting an image is input from the user interface unit in order to set the image as the background picture of the display unit, the image corresponding to the input user command is supplied from the external terminal or the memory unit (operation 610). A user command for processing the input image using a predetermined image processing technique is input (operation 620). By processing the input image using an image processing technique such as scaling, sharpening, brightness adjustment, color contrast adjustment, and rotation determined by the user, the state of the image is controlled and the letters or figures which are displayed along with the processed image are processed into a complementary color of the processed image (operation 630). The processed image is set as the background picture of the display unit and the processed image and the letters or figures are displayed on the display unit (operation 640). Preferably, an image area displayed on the display unit is captured and the captured image area is subjected to operations 620 and 630 again, thereby acquiring an image which will be the background picture of the display unit.

Figure 7:
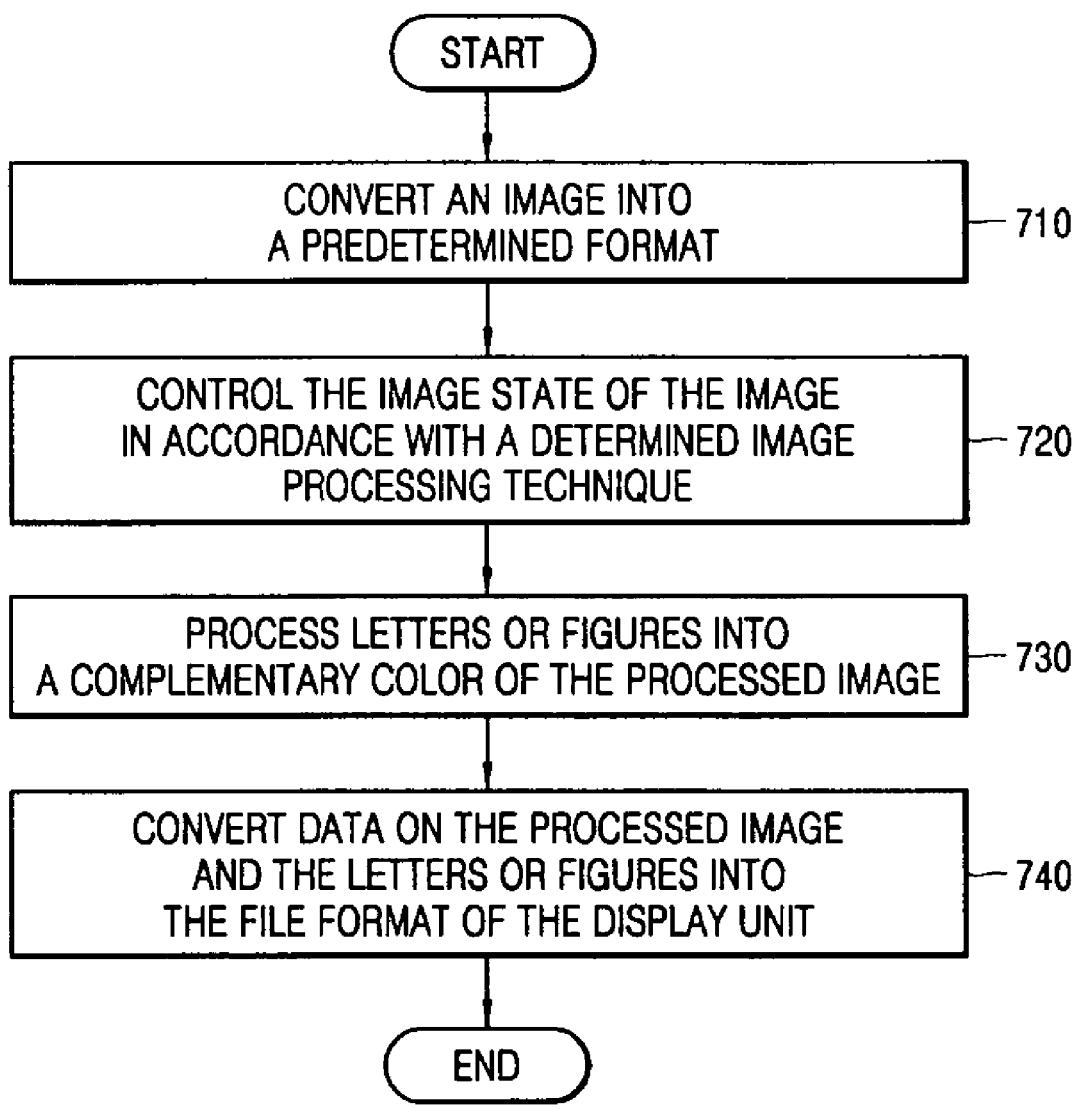
FIG. 7 is a flowchart illustrating operation of processing a predetermined image into the background picture of the display unit according to an embodiment of the invention in more detail.

FIG. 7 is a flowchart illustrating in more detail an exemplary operation (operation 630) of processing an image into the background picture of the display unit. Referring to FIG. 7, the image data input through the input unit is converted into image data having a predetermined file format (operation 710). For example, the image input through the input unit may JPEG, BMP, or TIF format, and the image data is preferably converted into data of the YCC file format. By adjusting distinction, brightness, and color contrast of the converted image with a predetermined image processing technique, the state of the image is controlled (operation 720). The colors of the letters or figures displayed along with the image are processed into a complementary color of the image (operation 730). The processed image and the letters or figures are converted into the file format of the display unit (operation 740). For example, the image data of the YCC file format and the letters or figures of the YCC file format are converted into image data of an RGB file format.

Figure 8:
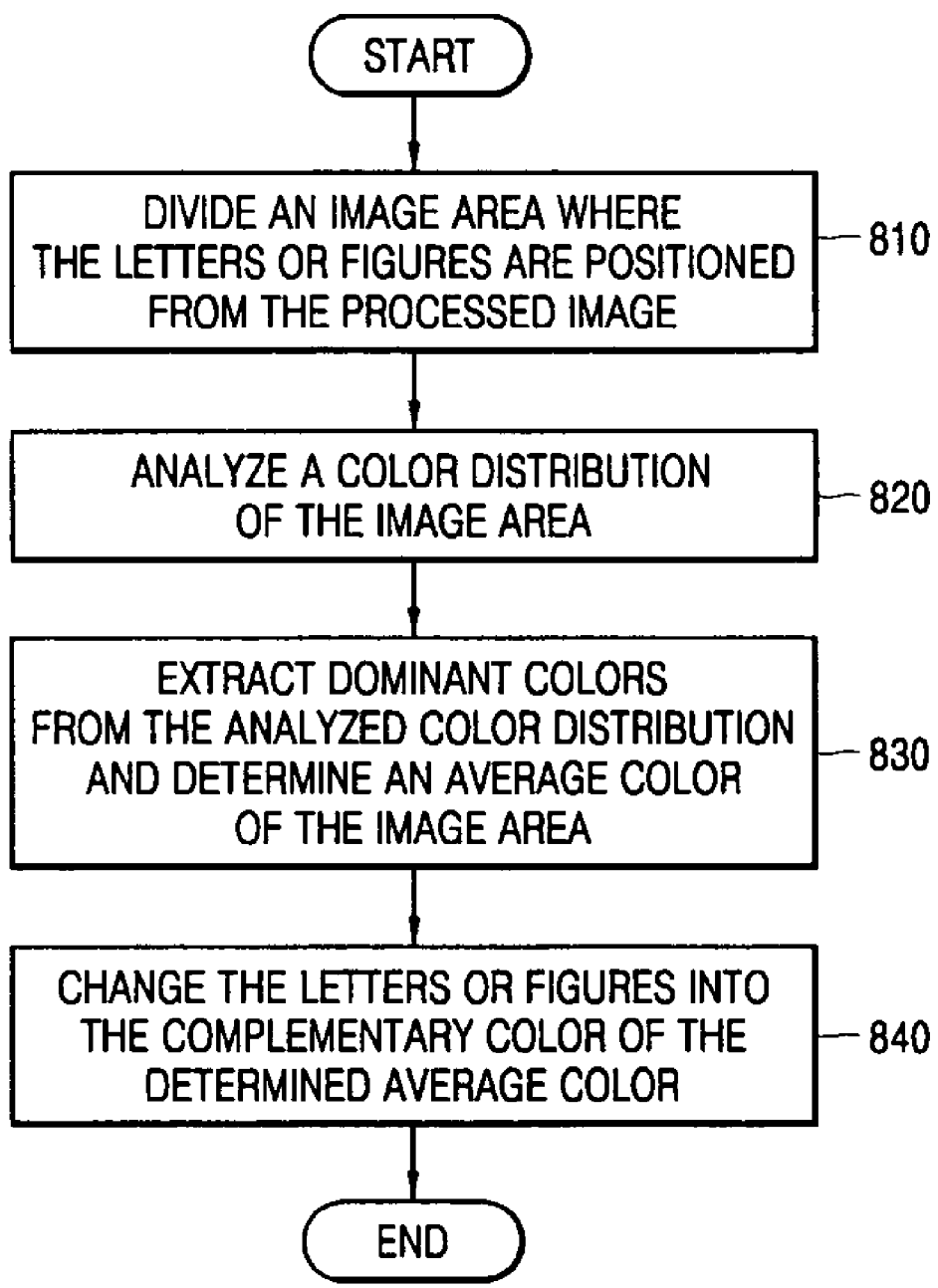
FIG. 8 is a flowchart illustrating an operation of processing letters or figures into a complementary color of the image according to an embodiment of the invention in more detail.

FIG. 8 is a flowchart illustrating in more detail an exemplary operation (operation 730) of processing the letters or figures into a complementary color of the image in FIG. 7. Referring to FIG. 8, an image area where the letters or figures are positioned is divided from the processed image (operation 810). The image area is preferably a rectangular area or an elliptical area, but it could also be any other suitable shape. The image area may have a size such that the outline is spaced by 0.5 cm to 2 cm from the letters or figures. However, the shape and size of the image area may be set differently as needed depending upon the technical fields to which an embodiment of the present invention is applied. The color distribution of the image area is analyzed (operation 820). Dominant colors are extracted from the image area on the basis of the analyzed color distribution and an average color of the extracted colors is determined (operation 830). A complementary color of the determined average color is calculated, and the colors of the letters or figures of the image area are changed to the complementary color (operation 840). As used herein, the term "average color" is not necessarily a mathematically accurate "average." A complimentary color is selected such that the letters or figures preferably stand out against the background picture. Thus, for example, a light color is preferably selected for letters or figures set against a dark background. Similarly, a dark color is preferably selected for letters or figures set against a light background.

Figure 9:
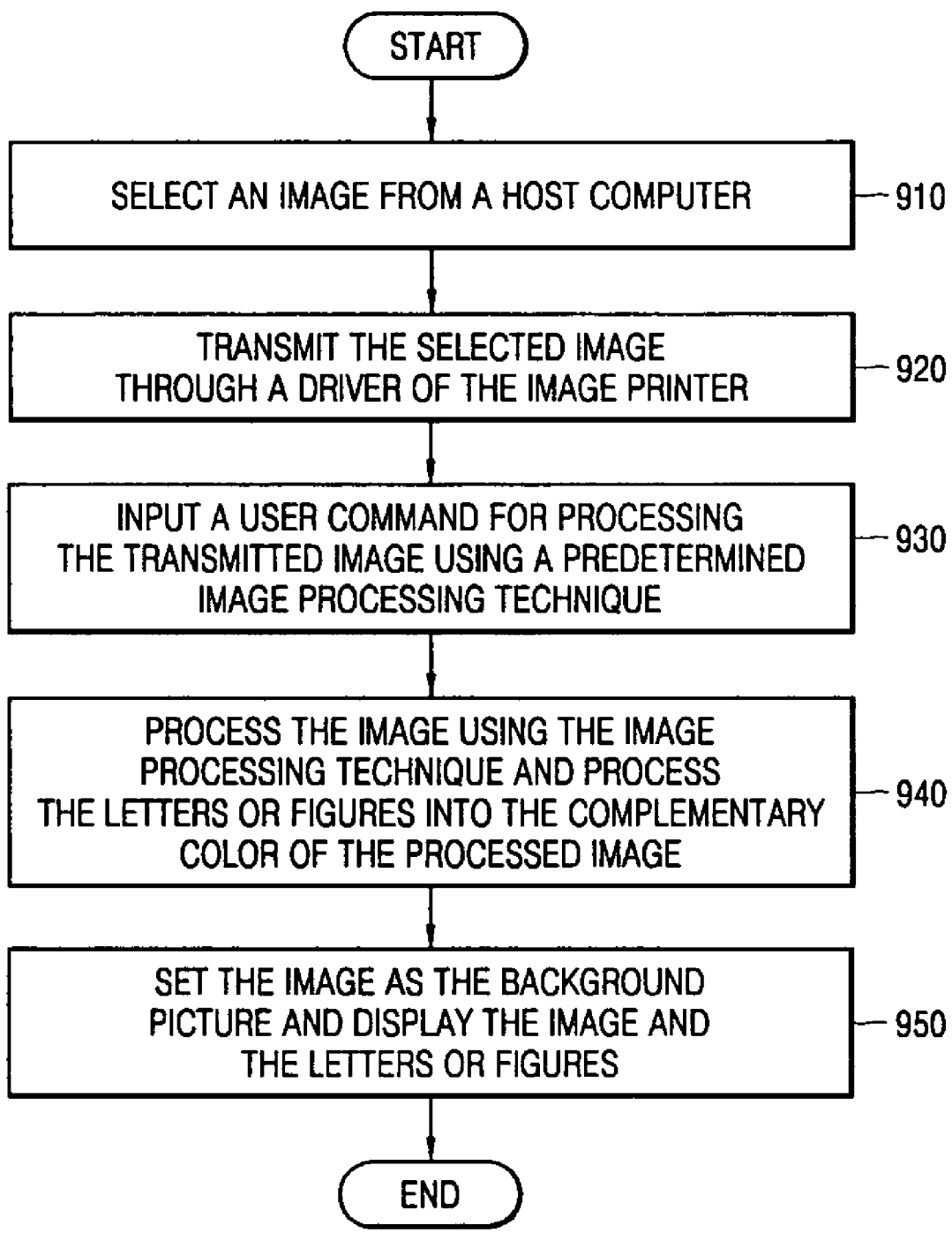
FIG. 9 is a flowchart illustrating a method of setting an image selected through a driver of the image printer as a background picture in a host computer according to an embodiment of the present invention.

FIG. 9 is a flowchart illustrating a method of setting an image selected through a driver of the image printer as a background picture in a host computer according to an embodiment of the present invention. Referring to FIG. 9, an image which will be set as the background picture of the display unit is selected from predetermined images stored in the host computer (operation 910). The selected image is sent to the image printer through the driver of the image printer (operation 920). A predetermined image processing technique for setting the sent image as the background picture of the display unit is input through the user interface unit (operation 930). The image is processed using the input image processing technique and the letters or figures displayed along with the image are processed into the complementary color of the processed image (operation 940). The processed image is set as the background picture of the display unit and the processed image and the letters or figures are displayed (operation 950).

Figure 10:
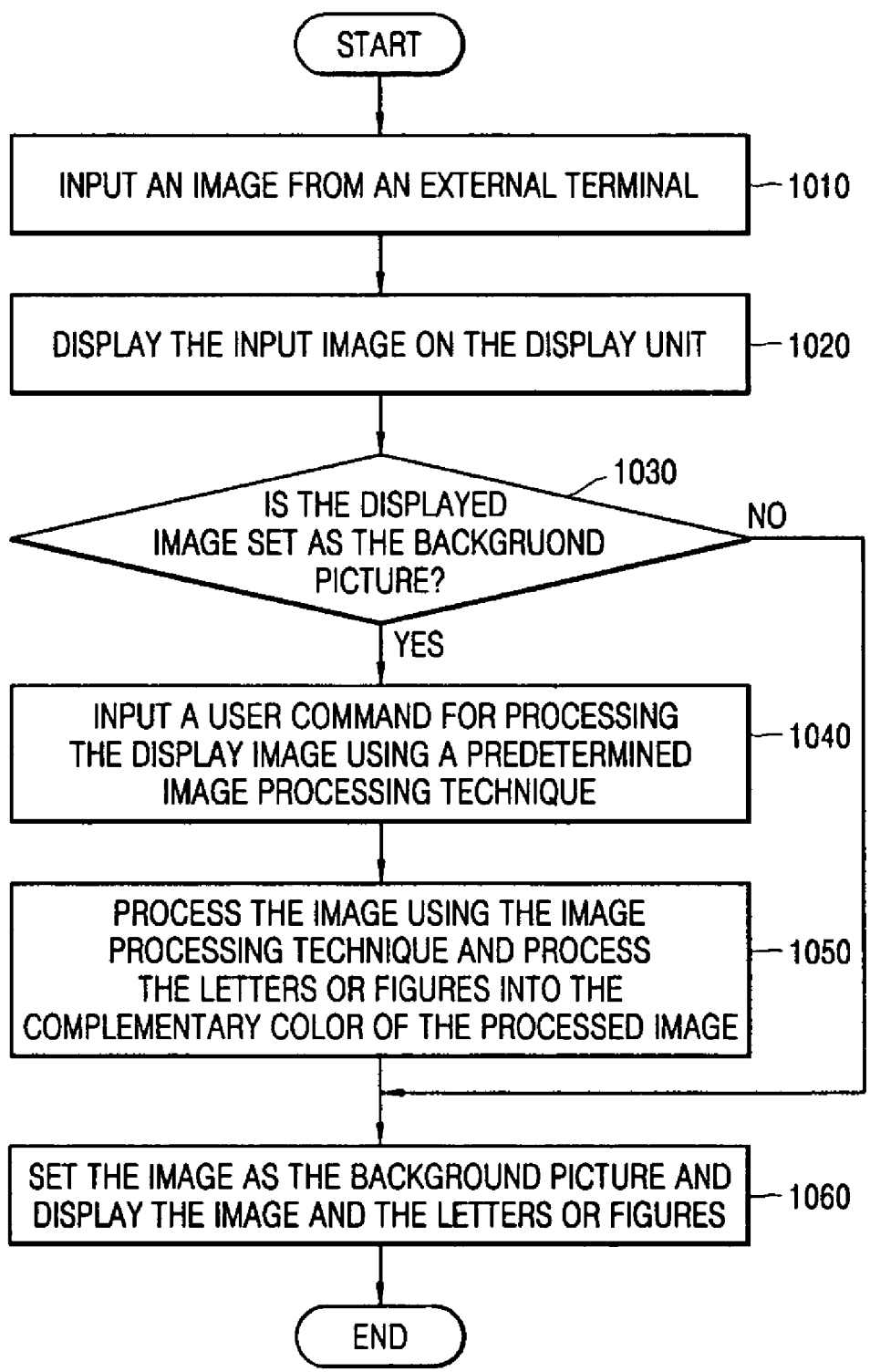
FIG. 10 is a flowchart illustrating a method of displaying an image input from an external terminal and setting the displayed image as a background picture according to an embodiment of the present invention.

FIG. 10 is a flowchart illustrating a method of displaying an image input from an external terminal and setting the displayed image as a background picture according to an embodiment of the present invention. Referring to FIG. 10, an image is input from an external terminal such as a portable storage device (operation 1010). The input image is displayed on the display unit (operation 1020). A user command for setting the displayed image as the background picture of the display unit is input (operation 1030). When the user command for setting the image as the background picture is input, a predetermined image processing technique for setting the image as the background picture of the display unit is input through the user interface unit (operation 1040). The image is processed by the image processing technique and the letters or figures displayed along with the image are processed into the complementary color of the processed image (operation 1050). The processed image is set as the background picture of the display unit and the image and the letters or figures are displayed (operation 1060).

Figure 11:
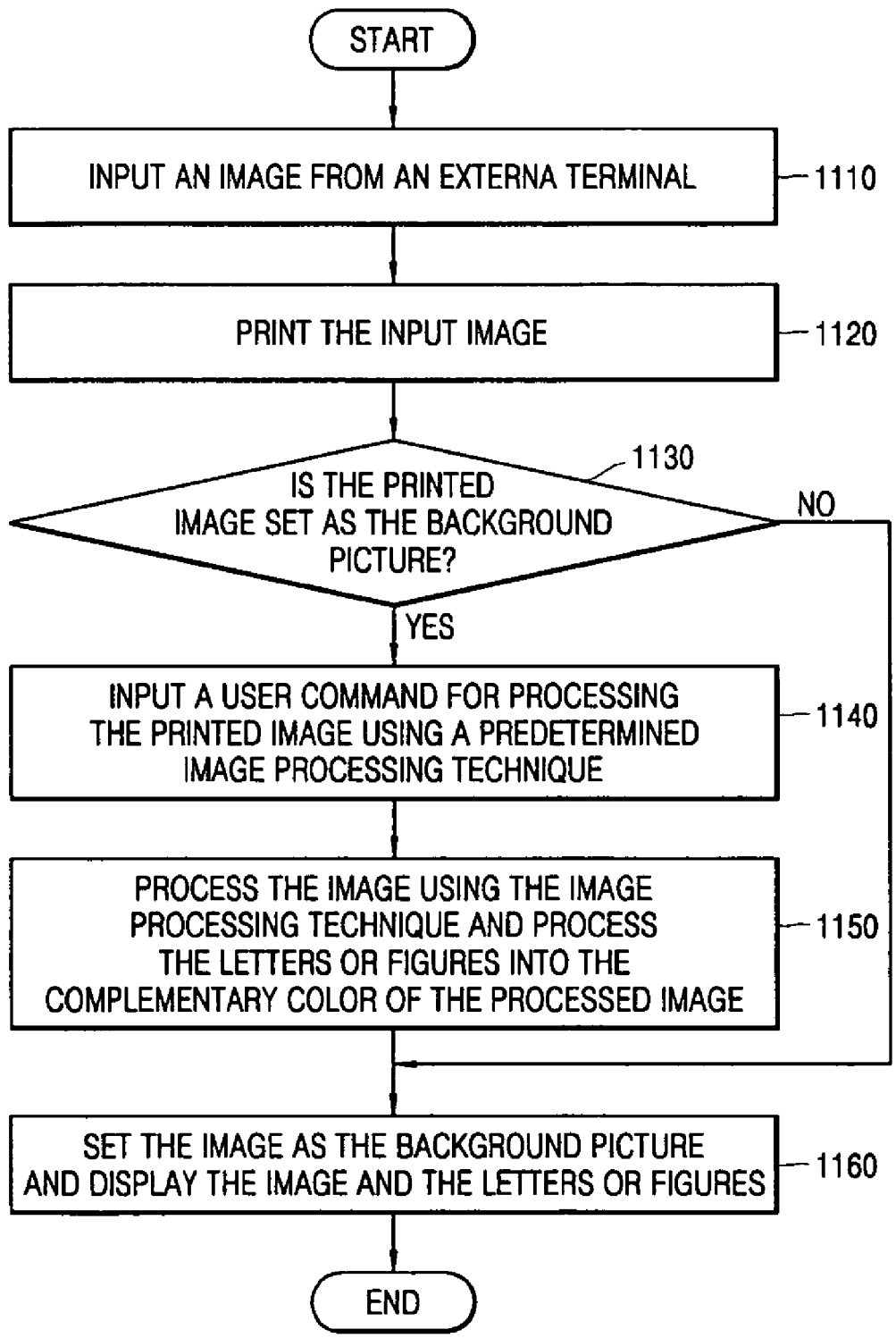
FIG. 11 is a flowchart illustrating a method of printing an image input from an external terminal and setting the printed image as a background picture according to an embodiment of the present invention.

FIG. 11 is a flowchart illustrating a method of printing an image input from an external terminal and setting the printed image as a background picture according to an embodiment of the present invention. Referring to FIG. 11, the predetermined image is input from an external terminal such as a portable storage device (operation 1110), and the input image is printed by the image printer (operation 1120). A user command for setting the printed image as the background picture of the display unit is input (operation 1130). When the user command for setting the printed image as the background picture is input, the predetermined image processing technique for setting the image as the background picture of the display unit is input through the user interface unit (operation 1140). The image is processed using the input image processing technique and the letters or figures displayed along with the image are processed into the complementary color of the processed image (operation 1150). The processed image is set as the background picture of the display unit and the image and the letters or figures are displayed (operation 1160).

The image printer according to an embodiment of the present invention can preferably process an image input from an external terminal for itself and can set the processed image as the background picture of the display unit. Therefore, it is possible to set an image as a background picture depending upon the user's taste.

On the other hand, the image printer can directly process an image stored in the external terminal and an image printed by the image printer and can set the printed image as the background picture of the display unit.

Embodiments of the present invention can be written as computer programs and can be implemented in general-use digital computers that execute the programs using a computer readable recording medium. Examples of the computer readable recording medium include magnetic storage media (such as read only memory (ROM), floppy disks, hard disks, and so on), optical recording media (such as CD-ROMs, or DVDs, and the like), and storage media such as carrier waves (such as, transmission through the Internet).

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An image printer having a display unit, the image printer comprising:
    a user interface unit for selecting an image by a user;
    an image processing unit for processing the image selected by a user in accordance with a manually selected predetermined image processing technique selected by the user prior to setting the selected image as a background picture of the display unit;
    a scaling unit for scaling the image in accordance with the size of the display unit; and
    a setting unit for setting the processed image as the background picture of the display unit;
    wherein the background picture is set with image scaling, sharpening, brightness adjustment, color contrast adjustment and rotation determination via user command, and a state of the image is controlled and the letters or figures which are displayed along with the processed image are processed into a complementary color of the processed image;
    wherein the display unit displays the processed image;
    wherein the image processing unit comprises a division unit for dividing the processed image to acquire a predetermined image area, which is superimposed upon the processed image, where letters or figures are positioned within an outline of the image area shape.

2. The image printer according to claim 1, further comprising an input unit for inputting data on the image from an external terminal.

3. The image printer according to claim 2, wherein the input image is selected and input through a driver of the image printer from a host computer connected to the image printer.

4. The image printer according to claim 2, wherein the input image is displayed on the display unit and the displayed image is selected as the background picture of the display unit.

5. The image printer according to claim 2, wherein the input image is printed by the image printer and the printed image is selected as the background picture of the display unit.

6. The image printer according to claim 2, further comprising a user interface unit for inputting a user command for receiving the image, a user command for selecting the image as the background picture, and a user command for selecting an image processing technique used for setting the selected image as the background picture.

7. The image printer according to claim 6, further comprising a capture unit for capturing an image portion in the image displayed on the display unit;
    wherein the captured image portion is processed by the image processing unit and is set as the background picture of the display unit.

8. The image printer according to claim 1, wherein the image processing unit comprises:
    a first data converter for analyzing a file format of the image and converting the image into an image having a predetermined file format depending upon a type of the analyzed file format;
    a first image processor for adjusting the converted image to a predetermined size and controlling the state of the image in accordance with a predetermined image processing technique; and
    a second data converter for converting the processed image into a file format of the display unit.

9. The image printer according to claim 8, further comprising a second image processor for processing letters or figures displayed on the display unit along with the image into a complementary color of the processed image,
    wherein the second data converter converts the letters or figures into the file format of the display unit.

10. The image printer according to claim 9, wherein the second image processor comprises:
    an analysis unit for analyzing a color distribution of the acquired image area;
    a determination unit for extracting dominant colors from the analyzed color distribution and determining an average color of the acquired image area; and
    a change unit for changing the color of the letters or figures to a complementary color of the determined average color.

11. A method of setting an image as a digital wallpaper background picture of a display unit in an image printer, the method comprising:
    (a) selecting an image by a user via a user interface unit;
    (b) processing the image selected by a user, via an image processing unit, using a manually selected predetermined image processing technique selected by the user prior to setting the selected image as the digital wallpaper background picture of the display unit;
    (c) scaling the image, via a scaling unit, in accordance with the size of the display unit;
    (d) setting the processed image as the background picture of the display unit, wherein the background picture is set with image scaling, sharpening, brightness adjustment, color contrast adjustment and rotation determination via user command, and a state of the image is controlled and the letters or figures which are displayed along with the processed image are processed into a complementary color of the processed image;

(e) displaying the processed image on the display unit; and (f) dividing the processed image, via a division unit, to acquire a predetermined image area, which is superimposed upon the processed image, where letters or figures are positioned within an outline of the image area shape.

12. The method according to claim 11, further comprising inputting data on the image from an external terminal.

13. The method according to claim 12, wherein the image is selected by the user by:

displaying the input image on the display unit; and selecting the displayed image as the background picture of the display unit.

14. The method according to claim 12, wherein the image is selected by the user by:

printing the input image with the image printer; and selecting the printed image as the background picture of the display unit.

15. The method according to claim 12, further comprising:

inputting a user command for processing the input image.

16. The method according to claim 15, further comprising:

capturing an image portion in the image displayed on the display unit, wherein the captured image portion is processed in operation (b) and is set as the background picture of the display unit.

17. The method according to claim 11, wherein operation (b) comprises:

(b1) analyzing a file format of the image and converting the image into an image having a predetermined file format depending upon kinds of the analyzed file format;

(b2) adjusting the converted image to a predetermined size and controlling the state of the image using a predetermined image processing technique; and (b3) converting the processed image into a file format of the display unit.

18. The method according to claim 17, wherein operation (b) further comprises:

(b4) processing letters or figures displayed on the display unit along with the image into a complementary color of the processed image, wherein the processed image and the letters or figures processed into the complementary color are converted into the file format of the display unit.

19. The method according to claim 18, wherein operation (b4) comprises:

analyzing a color distribution of the acquired image area;

extracting dominant colors from the analyzed color distribution and determining an average color of the acquired image area; and changing the color of the letters or figures to a complementary color of the determined average color.

* * * * *